(12) United States Patent
Zou et al.

(10) Patent No.: US 8,315,005 B1
(45) Date of Patent: Nov. 20, 2012

(54) RAMP DETECTION BY PROFILE SWEEP METHOD UTILIZING INTEGRATOR VALUES

(75) Inventors: Li Zou, San Jose, CA (US); Duc H. Banh, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/614,166

(22) Filed: Nov. 6, 2009

(51) Int. Cl.
G11B 21/02 (2006.01)

(52) U.S. Cl. .......................................................... 360/75
(58) Field of Classification Search .................. None
See application file for complete search history.

(56) References Cited

U.S. PATENT DOCUMENTS

| | | | |
|---|---|---|---|
| 4,321,517 A * | 3/1982 | Touchton et al. ............. | 318/618 |
| 4,691,152 A * | 9/1987 | Ell et al. ........................ | 318/616 |
| 5,384,675 A | 1/1995 | Crawforth et al. | |
| 5,455,723 A * | 10/1995 | Boutaghou et al. ............. | 360/75 |
| 5,559,648 A | 9/1996 | Hunter et al. | |
| 5,663,846 A * | 9/1997 | Masuoka et al. ................ | 360/75 |
| 5,781,363 A * | 7/1998 | Rowan et al. ............. | 360/78.09 |
| 5,963,393 A * | 10/1999 | Rowan et al. ............. | 360/78.06 |
| 6,563,660 B1 | 5/2003 | Hirano et al. | |
| 6,590,732 B2 | 7/2003 | Kitagawa et al. | |
| 6,636,377 B1 | 10/2003 | Yu et al. | |
| 6,643,088 B1 | 11/2003 | Kawachi | |
| 6,721,121 B1 | 4/2004 | Schreck et al. | |
| 6,754,027 B2 * | 6/2004 | Hirano et al. .................... | 360/75 |
| 6,826,007 B1 * | 11/2004 | Patton, III ................... | 360/78.06 |
| 6,902,007 B1 | 6/2005 | Orr et al. | |
| 6,917,489 B2 * | 7/2005 | Lee ............................. | 360/78.06 |
| 6,920,007 B2 | 7/2005 | Tominaga et al. | |
| 6,977,791 B2 * | 12/2005 | Zhu et al. ........................ | 360/75 |
| 7,019,932 B2 | 3/2006 | Hirano et al. | |
| 7,031,093 B2 * | 4/2006 | Suzuki ............................ | 360/75 |
| 7,046,474 B2 * | 5/2006 | Kuramoto et al. ............... | 360/75 |
| 7,046,475 B2 | 5/2006 | Hosokawa | |
| 7,068,459 B1 | 6/2006 | Cloke et al. | |
| 7,088,533 B1 | 8/2006 | Shepherd et al. | |
| 7,177,111 B2 | 2/2007 | Gururangan et al. | |
| 7,212,371 B2 * | 5/2007 | Abe et al. ..................... | 360/77.02 |
| 7,274,527 B2 * | 9/2007 | Calfee et al. .................... | 360/75 |
| 7,391,586 B2 | 6/2008 | Keast | |
| 7,486,466 B2 * | 2/2009 | Hara et al. ....................... | 360/75 |
| 7,869,155 B1 * | 1/2011 | Wong .............................. | 360/75 |
| 2002/0181139 A1 * | 12/2002 | Weiehelt et al. ................ | 360/75 |
| 2005/0152060 A1 | 7/2005 | Gururangan et al. | |
| 2005/0280916 A1 | 12/2005 | Calfee et al. | |
| 2006/0005403 A1 | 1/2006 | Calfee et al. | |
| 2007/0076317 A1 | 4/2007 | Keast | |

OTHER PUBLICATIONS

U.S. Appl. No. 11/760,601, filed Jun. 8, 2007, 24 pages.
www.microesys.com/dataStorage/specifications.html.
http://www.microesys.com/pdf/pa2000.pdf, "PA 2000 High Performance Positioning System for Servotrack Writers", MicroE Systems, PA2000 Rev.S1, 2 pages.

* cited by examiner

Primary Examiner — K. Wong

(57) ABSTRACT

A system to detect a ramp position is disclosed. The system includes a head positioner coupled to an actuator arm to position a head relative to a disk and a controller to: control the head positioner to move the head toward the ramp; determine a plurality of integrator values while moving the head; generate a threshold based on the plurality of integrator values; and determine the ramp position based on a first integrator value exceeding the threshold.

30 Claims, 7 Drawing Sheets

RAMP DETECTION BY PROFILE SWEEP METHOD UTILIZING INTEGRATOR VALUES

BACKGROUND

During manufacturing of a disk drive, servo sectors are typically written to a disk to define a plurality of evenly-spaced, concentric tracks. Servo writers are typically used to write the servo sectors to the disk during disk drive manufacturing. Servo writers often employ extremely accurate head positioning mechanics, such as laser interferometers or optical encoders, to ensure that the servo sectors are written at the proper radial location, typically, from the inner diameter of the disk to the outer diameter of the disk. In addition, extremely accurate clocking systems may be utilized in order to write the servo sectors in the proper circumferential locations on the disk. Alternatively, instead of utilizing a servo writer, disk drives may perform self servo-writing in which the disk drive itself writes the servo sectors to the disk.

Referring to FIG. 1A, an external servo writer 130 may be used for writing spiral reference patterns $136_0$-$136_7$ (FIG. 1B) to a disk 116 of a disk drive 118. The spiral reference patterns (servo spiral seeds) may include reference servo bursts that can be used for forming product servo bursts. The disk drive 118 comprises control circuitry 120 and a head disk assembly (HDA) 122. The HDA comprises the disk 116, an actuator arm 124, a head 126 connected to a distal end of the actuator arm 124, and a voice coil motor 128 for rotating the actuator arm 124 about a pivot to position the head 126 radially over the disk 116. The external spiral servo writer 130 may be used to control a radial location of the head 126 for writing a plurality of the spiral reference patterns $136_0$-$136_7$ between an inner radial location 131 and an outer radial location 132.

A head positioning pin 133 of the external spiral servo writer 130 may be inserted into the HDA 122 before writing the spiral reference patterns. The head positioning pin 133 may be used for engaging the actuator arm 124. The external spiral servo writer 130 comprises head positioning mechanics 134 used to derive a radial location of the head 126. The head positioning pin 133 is actuated in response to the radial location of the head 126 in a closed loop system in order to position the head 126 radially over the disk 116 while writing a plurality of reference servo bursts to the disk along a plurality of substantially spiral paths to form the plurality of spiral reference patterns $136_0$-$136_7$ as illustrated in FIG. 1B.

During the servo-writing of servo spiral seeds and/or other servo information to a disk, a nominal pre-determined stroke is typically used to write the servo information across the disk. The nominal stroke is usually pre-determined for a class of disk drives in order to prevent the writing of servo information too close to a ramp of the disk drive. By utilizing a pre-determined nominal stroke, the full area of each particular disk may not be utilized for writing servo information and defining the tracks of the disk drive. Accordingly, what is needed are apparatus and methods to accurately detect a ramp position relative to a disk in order to produce a customized servo write stroke to maximize the use of the area of the disk.

DETAILED DESCRIPTION

Figure 1A:
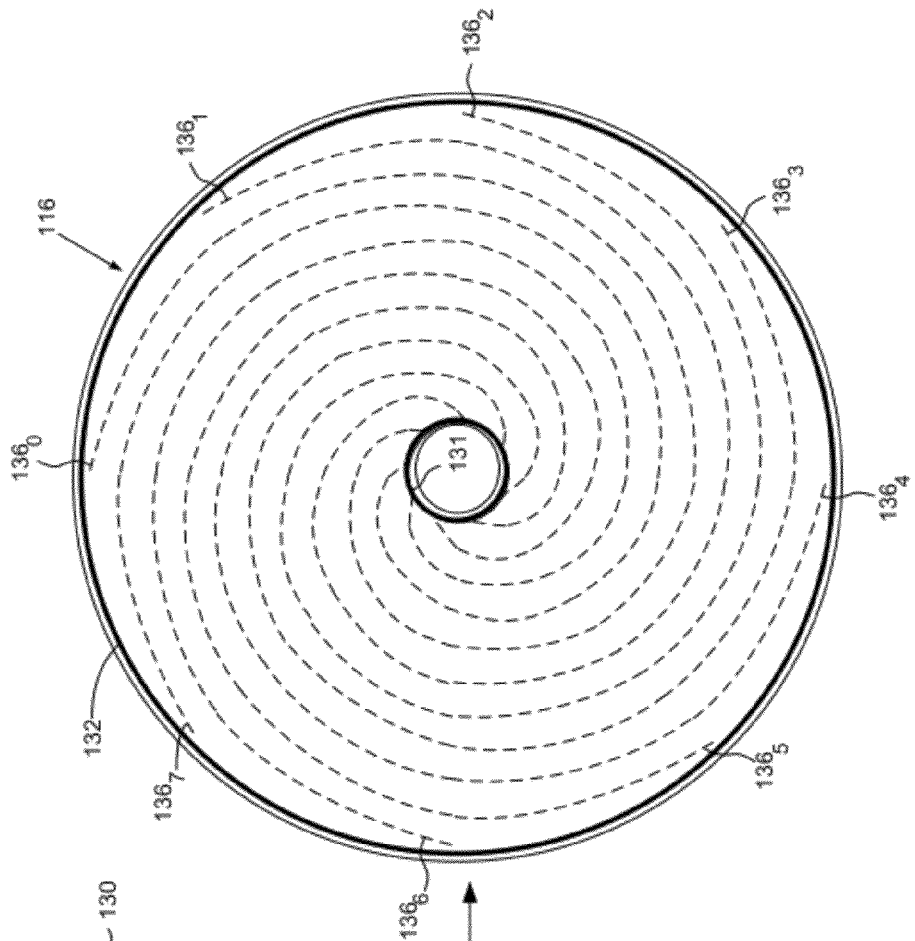
FIGS. 1A and 1B show an external spiral servo writer used to write a plurality of spiral reference patterns.
Figure 1B:
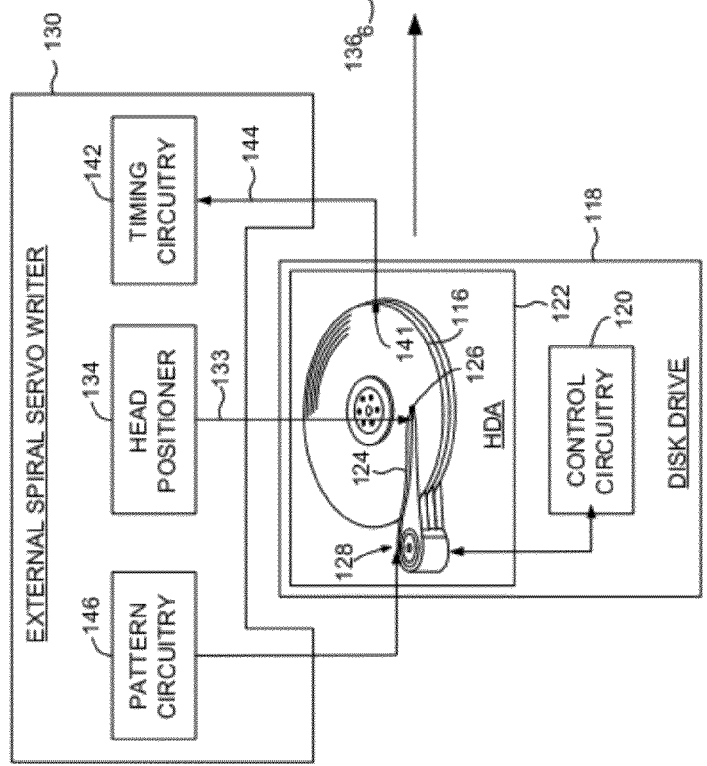
Figure 2:
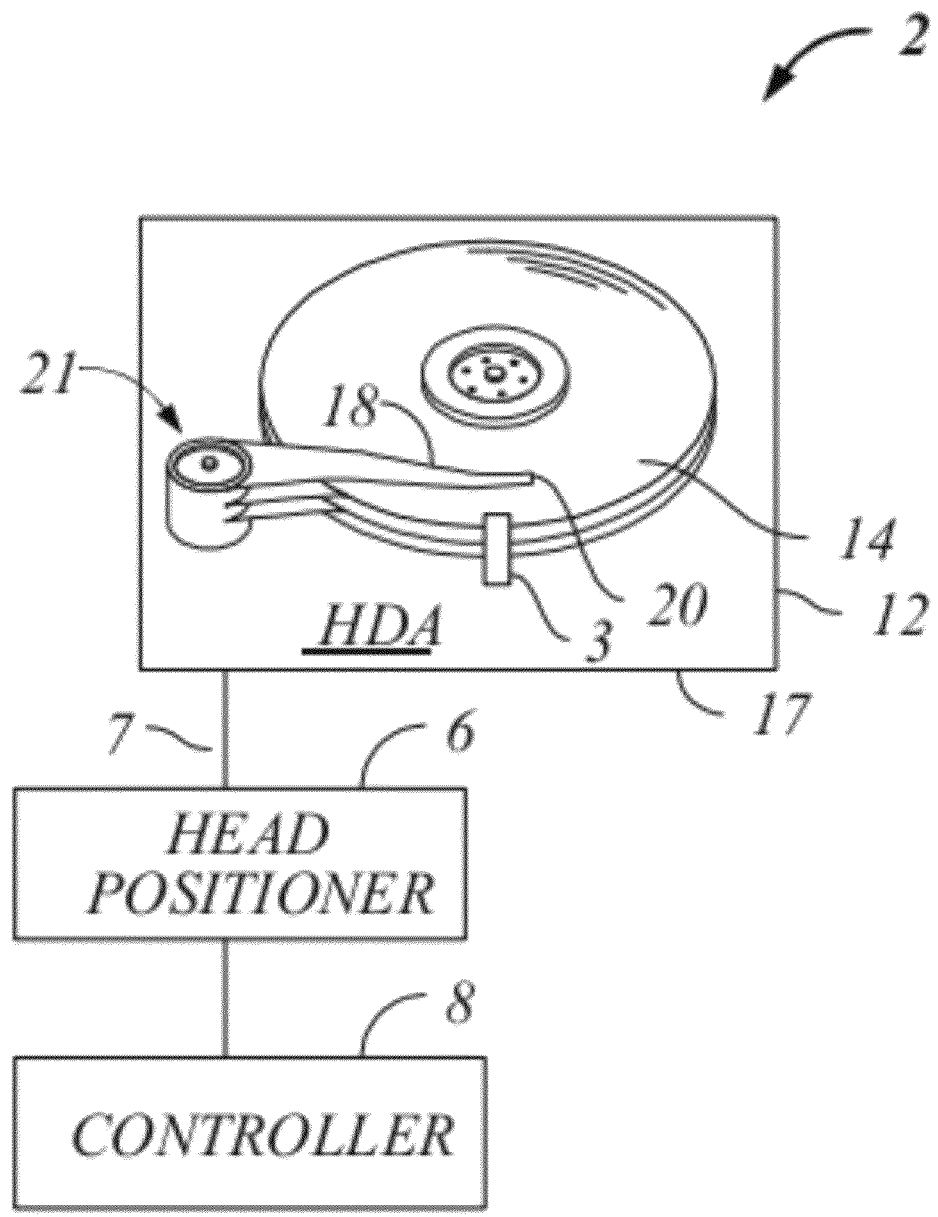
FIG. 2 is a block diagram illustrating an example of a system for detecting a ramp position in a disk drive prior to servo-writing, according to one embodiment of the invention.

FIG. 2 is a block diagram illustrating an example of a system 2 for detecting a ramp position in a disk drive 12 prior to servo-writing, according to one embodiment of the invention. System 2 may be employed to write servo spiral seeds and/or other servo information to one or more blank disks 14 of a head disk assembly (HDA) 17 of the disk drive 12. It should be appreciated that this is a simplified illustration of an HDA, and many components are not shown and are not discussed, in order not to obscure the embodiments of the invention. Further, hereinafter, servo-writing will be discussed with reference to blank disk 14, however, it will be appreciated by those with skill in the art that one or more blank disks 14 may be simultaneously or serially written to.

Disk drive 12 may comprise HDA 17 that includes the disk 14, an actuator arm 18, a head 20 coupled to the distal end of actuator arm 18, and a voice coil motor (VCM) 21 for rotating actuator arm 18 about a pivot to position head 20 radially over disk 14. In this example, a ramp 3 may be utilized for the purpose of loading and unloading head 20 to and from disk 14, respectively.

Further, according to embodiments of the invention, system 2 may include a head positioner 6 for actuating a head positioning pin 7 to position head 20 of actuator arm 18 of HDA 17 radially relative to disk 14. Additionally, system 2 includes a controller 8 coupled to head positioner 6 to control head positioner 6 in order to control the movement of head 20 coupled to actuator arm 18 toward ramp 3 at the outer diameter (OD) of disk 14. In other embodiments, ramp 3 may be located at the inner diameter (ID) of disk 14. Controller 8 may generally control head positioner 6 to move head 20 coupled to actuator arm 18 radially across disk 14.

Controller 8 may be used to determine a plurality of integrator values that may be generated by head positioner 6 in order to move head 20. Based upon the plurality of integrator values, controller 8 may generate a threshold and determine the ramp position based on a first integrator value exceeding the threshold. The plurality of integrator values may comprise integrated position errors representing a head positioner load current. The head positioner load current may increase in proportion to a frictional force of the ramp. The increase of the head positioner load current due to the frictional force of the ramp may be used to detect the ramp position.

It should also be noted that the plurality of integrator values representing the head positioner load current (i.e., integrator current) corresponds to the amount of force applied by the head positioner 6 to the actuator arm 18 and is representative of the mechanical impedance of the head positioner pin 7 against the actuator arm 18. It follows that when integrator values of the head positioner load current increase substantially, it may be due to a resistance, such as introduced by the ramp 3.

Figure 3:
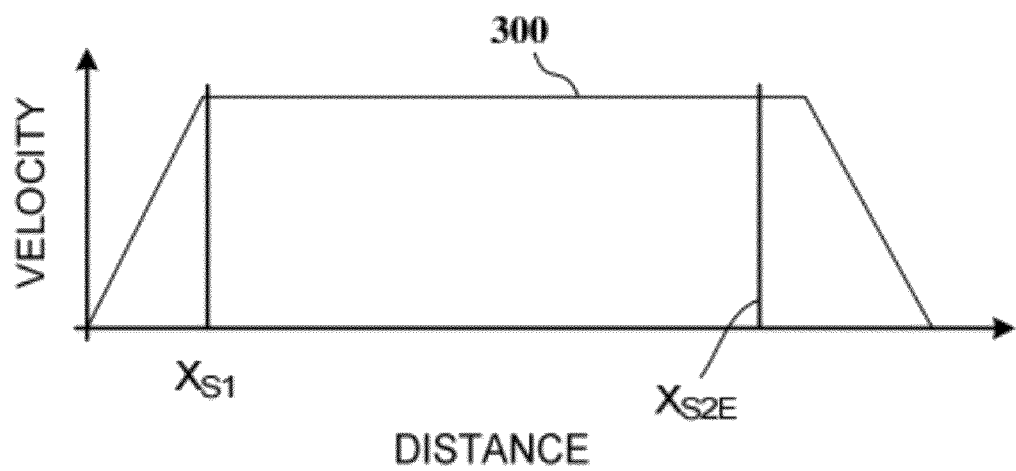
FIG. 3 shows a simplified head velocity profile utilized to determine a ramp position and to write spiral reference patterns to a disk, according to one embodiment of the invention.

In one embodiment, controller 8 may determine the plurality of integrator values by controlling the head positioner 6 to move the head 20 from an initial position on the disk 14 toward the ramp 3 according to a velocity profile 300 as shown in FIG. 3. As illustrated, controller 8 controls the head positioner 6 to move the head 20 toward the ramp 3 at a constant velocity. Alternatively, controller 8 may control the head positioner 6 to move the head 20 toward the ramp 3 at a constant acceleration. In another embodiment, controller 8 may control the head positioner 6 to move the head 20 toward the ramp 3 at any predetermined movement profile.

Controller 8 may determine a plurality of position values associated with the plurality of integrator values when controlling the head positioner 6 to move the head 20 toward the ramp 3. System 2 may employ accurate head positioning mechanics, such as laser interferometers or optical encoders to measure such position values relative to a reference position. In one embodiment, the reference position may be a crash stop of the disk drive 12. In one embodiment, the head positioner 6 may include a laser interferometer for generating a circumferential and a radial position of the head 20. Alternatively, the head positioner 6 may include an optical encoder for generating the circumferential and radial position of the head 20. However, any suitable device for generating the circumferential and radial position of the head 20 may be employed.

Figure 4:
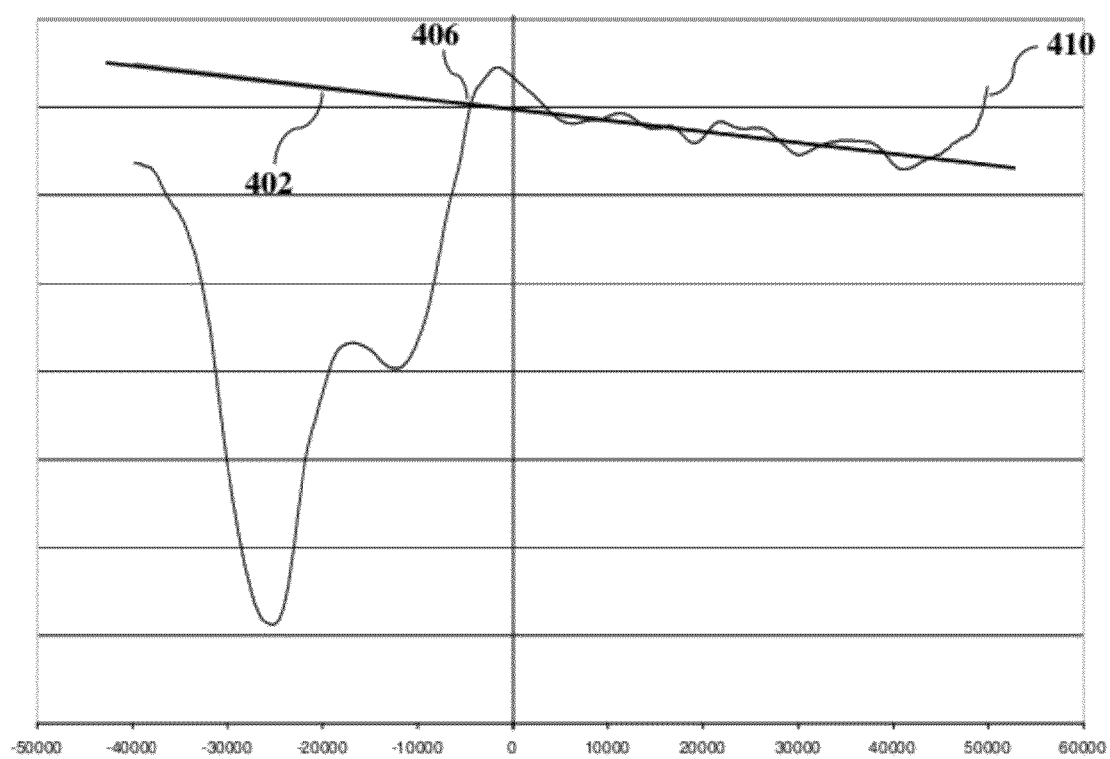
FIG. 4 is a graph illustrating an example plurality of integrator values of a head positioner current as a head is moved towards a ramp located at an outer diameter (OD), according to one embodiment of the invention.

Controller 8 may generate the threshold by performing a curve fit to a subset of the plurality of integrator values using a linear mathematical function. Referring to FIG. 4, curve 410 illustrates example integrator values as the head is moved from the ID to the OD (right to left), according to one embodiment. The x-axis represents certain track numbers from ID to OD and the y-axis is representative of integrator values. To determine a threshold, a straight line 402 is fit to a subset of the plurality of integrator values 410. For example, the straight line 402 may be generated by curve-fitting a predetermined number of integrator values after a constant velocity is reached from the initial position. Alternatively, controller 8 may generate a threshold by performing a curve fit to a subset of integrator values using a second order mathematical function. It should be appreciated that a wide variety of mathematical functions may be utilized to determine a threshold from the integrator values.

In one embodiment, controller 8 may determine the ramp position when a first integrator value exceeds the threshold. In this embodiment, exceeding the threshold may occur when the first integrator value equals the threshold. In one embodiment, controller 8 may evaluate the plurality of integrator values from an OD (left in FIG. 4) towards an ID (right in FIG. 4). Controller 8 may determine the ramp position by determining an intersection point 406 between a first integrator value and the straight line 402. Alternatively, the controller 8 may determine the ramp position based on more than one integrator value exceeding the threshold.

In another embodiment, controller 8 may determine the ramp position by determining when at least a first integrator value is within a certain percentage of the straight line 402. In one embodiment, the threshold may be 5% of the straight line 402. In another embodiment, the threshold may be 10% of the straight line 402. Alternatively, it should be appreciated that other percentages may be used to determine a threshold for determining the ramp position. Referring to FIG. 4, the plurality of integrator values may be evaluated from left (OD) to right (ID) to find at least a first integrator value that is within 5% of the straight line 402. Alternatively, the plurality of integrator values may be evaluated from right (ID) to left (OD) to find at least a first integrator value that is within 5% of the straight line 402.

Figure 5:
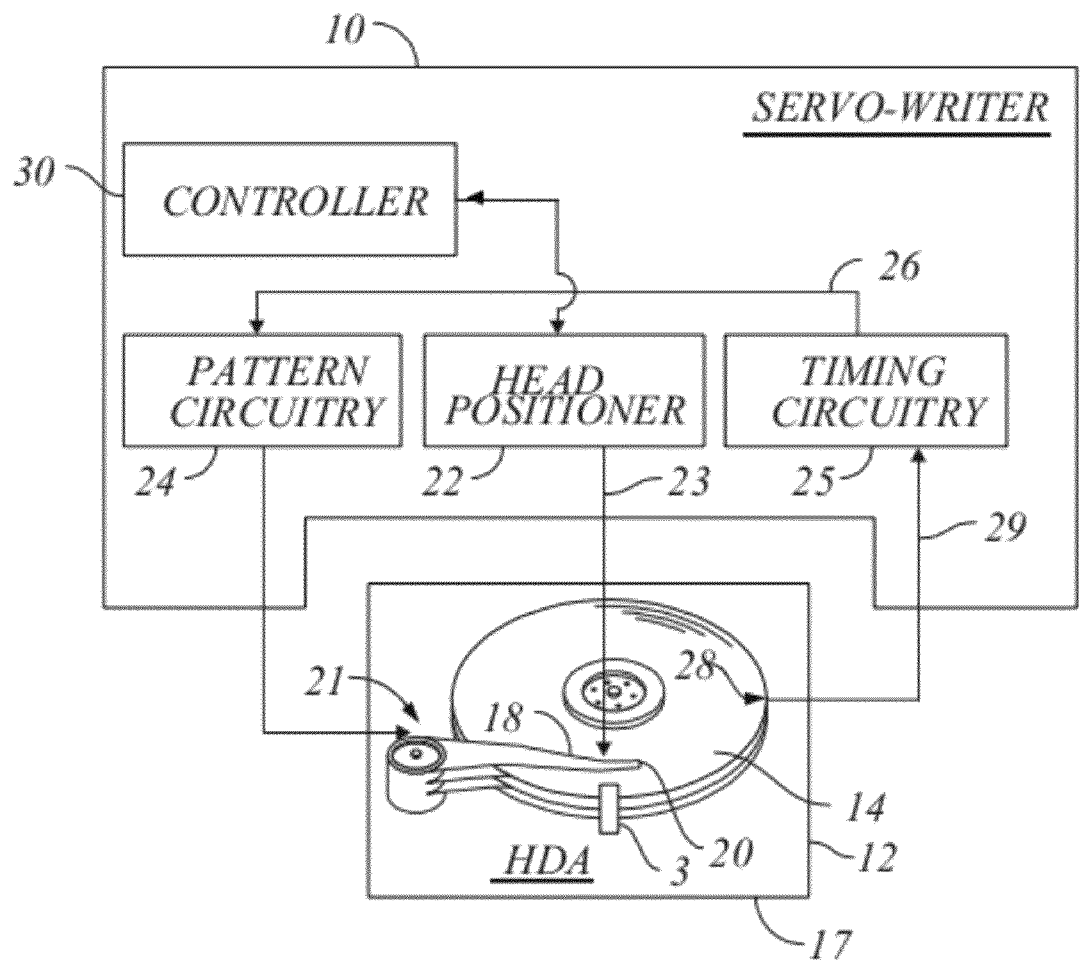
FIG. 5 is a block diagram illustrating an example of a servo track writer (STW) that may be coupled to a disk drive or simply an HDA of a disk drive in order to detect a ramp and write servo spirals to a disk, according to one embodiment of the invention.

As will be described, in one embodiment, a separate servo track writer (STW) may be utilized in conjunction with a disk drive to determine a ramp position and to write servo spirals to a disk. FIG. 5 is a block diagram illustrating an example of a separate STW 10 that may be coupled to a disk drive 12 or simply an HDA 17 of a disk drive 12 in order to determine a ramp position and write servo spiral seeds and/or other servo information to the disk 14, according to one embodiment of the invention.

In this embodiment, STW 10 may employ a write clock that is synchronized to the rotation of disk 14 such that a plurality of servo spiral seeds and/or other servo information may be written onto disk 14 at predetermined radial locations, in accordance with standard STW functionality. In this embodiment, STW 10 comprises a head positioner 22 for actuating a head positioning pin 23 using position measurement circuitry, such as a laser interferometer or an optical encoder. Pattern circuitry 24 generates a data sequence written to disk 14 for the servo spiral seeds and/or other servo information. In one embodiment, head positioner 22 may be a PA-2000 MICRO POSITIONER manufactured by MicroE Systems®.

In one embodiment, head positioner 22 of STW 10 uses push pin 23 to position head 20 of actuator arm 18 of HDA 17 relative to disk 14. Before servo-writing, controller 30 may be used to determine a plurality of integrator values that may be generated by head positioner 22 in order to move head 20. Based upon the plurality of integrator values, controller 30 may generate a threshold and determine the ramp position based on a first integrator value exceeding the threshold. The plurality of integrator values may comprise integrated position errors representing a head positioner load current. The head positioner load current may increase in proportion to a frictional force of the ramp. The increase of the head positioner load current due to the frictional force of the ramp may be used to detect the ramp position.

In this embodiment, controller 30 may determine the plurality of integrator values by controlling the head positioner 22 to move the head 20 from an initial position on the blank disk 14 toward the ramp 3 according to a velocity profile, such as the example velocity profile 300 shown in FIG. 3. In one embodiment, the ramp 3 may be located and detected at the OD of the disk 14. In an alternative embodiment, the ramp 3 may be located and detected at the ID of the disk 14.

Controller 30 may control the head positioner 22 to move the head 20 toward the ramp 3 at a constant velocity or at a constant acceleration. Alternatively, controller 30 may control the head positioner 6 to move the head 20 toward the ramp 3 at any predetermined movement profile.

Controller 30 may determine a plurality of position values associated with the plurality of integrator values when controlling the head positioner 22 to move the head 20 toward the ramp 3. STW 10 may employ accurate head positioning mechanics, such as laser interferometers or optical encoders to measure such position values relative to a reference position. In one embodiment, the reference position may be a crash stop of the disk drive 12. In some embodiments, the head positioner 22 may include a laser interferometer or an optical encoder for generating a circumferential and a radial position of the head 20. Alternatively, any suitable device for generating the circumferential and radial position of the head 20 may be employed.

Controller 30 may generate the threshold by performing a curve fit to a subset of the plurality of integrator values using a linear mathematical function or a second order mathematical function. Alternatively, it should be appreciated that a wide variety of mathematical functions may be utilized to characterize the thresholds for the integrator values.

Controller 30 may determine the ramp position based on a first integrator value exceeding the threshold. In one embodiment, controller 30 may evaluate the plurality of integrator values from an outer diameter towards an inner diameter. In one embodiment, controller 30 may determine the ramp position by determining an intersection point between a first integrator value and the threshold. In another embodiment, controller 30 may determine the ramp position by determining when a first integrator value is within a certain percentage of the threshold, such as 5%-10%. Alternatively, it should be appreciated that other percentages may be used to determine the ramp position.

After controller 30 determines the ramp position, controller 30 may then use the ramp position to calculate a customized servo stroke for the HDA 17 for that particular disk drive 12 between an inner diameter of disk 14 and the position of the detected ramp 3. In some embodiments, the customized servo write stroke length may also comprise a margin relative to the ramp position. Based upon these values, controller 30 can determine a track spacing for the plurality of tracks to be servo-written to disk 14 by STW 10 based upon the radial distance of the determined customized servo write stroke. Thus, controller 30 of STW 10 may command the writing of servo sectors to disk 14 to define the plurality of tracks based upon a new calculated track spacing and the customized servo write stroke.

In this way, STW 10 is able to implement a customized servo stroke (that is typically longer or "stretched") for each individual disk drive such that either track spacing between tracks can be increased (reducing "track squeeze" problems) or more tracks can be written to the disk itself.

It should be appreciated that for disk drives having multiple disks, heads, and ramps that the customized servo write stroke length may be limited by the head-ramp combination at which a head is first lifted up by the associated ramp. The customized servo write stroke length may therefore be limited by the shortest customized servo write stroke length of the head-ramp combinations. In addition, the customized servo write stroke length may comprise a margin relative to the ramp position.

Returning to FIG. 5, an optical or magnetic clock head 28 may be used to read an optical or magnetic clock to generate a clock signal 29 processed by timing circuitry 25 to synchronize a write clock signal 26 so that servo spiral seeds and/or other servo information are written at appropriate positions on disk 14. This optical or magnetic clock track may be formed at the outside radius of at least one disk, or it may also be formed at the inside radius of at least one disk, or it may be formed or written on some other rotating member of the disk drive such as the spindle motor, hub, or disk attachment clamp. Controller 30 controls HDA 17 such that the actuator arm 18 is rotated to position head 20 radially over disk 14 in order to write servo spiral seeds and/or other servo information onto disk 14 based upon the output clock signal 26 that had been processed by timing circuitry 25. In this way, a predetermined sequence of servo spiral seeds and/or other servo information may be servo-written to blank disk 14.

It should be appreciated that STW 10 may be utilized with a complete disk drive or just an HDA of a disk drive. It should further be appreciated that many other types of servo track writers (STWs) may be utilized with embodiments of the invention. For example, an external STW may be utilized in an external media writing environment such as a clean room. In an external media writing environment, multiple disks may be servo-written without having to be located in the HDA of a disk drive or within a disk drive itself.

In one embodiment, under the control of controller 30 and based upon write clock signal 26, head positioner 22 via pin 23 positions head 20 relative to disk 14 such that head 20 writes servo spiral seeds and/or other servo information onto disk 14 from either the ID to the OD of disk 14 or from the OD to the ID of disk 14.

Figure 6:
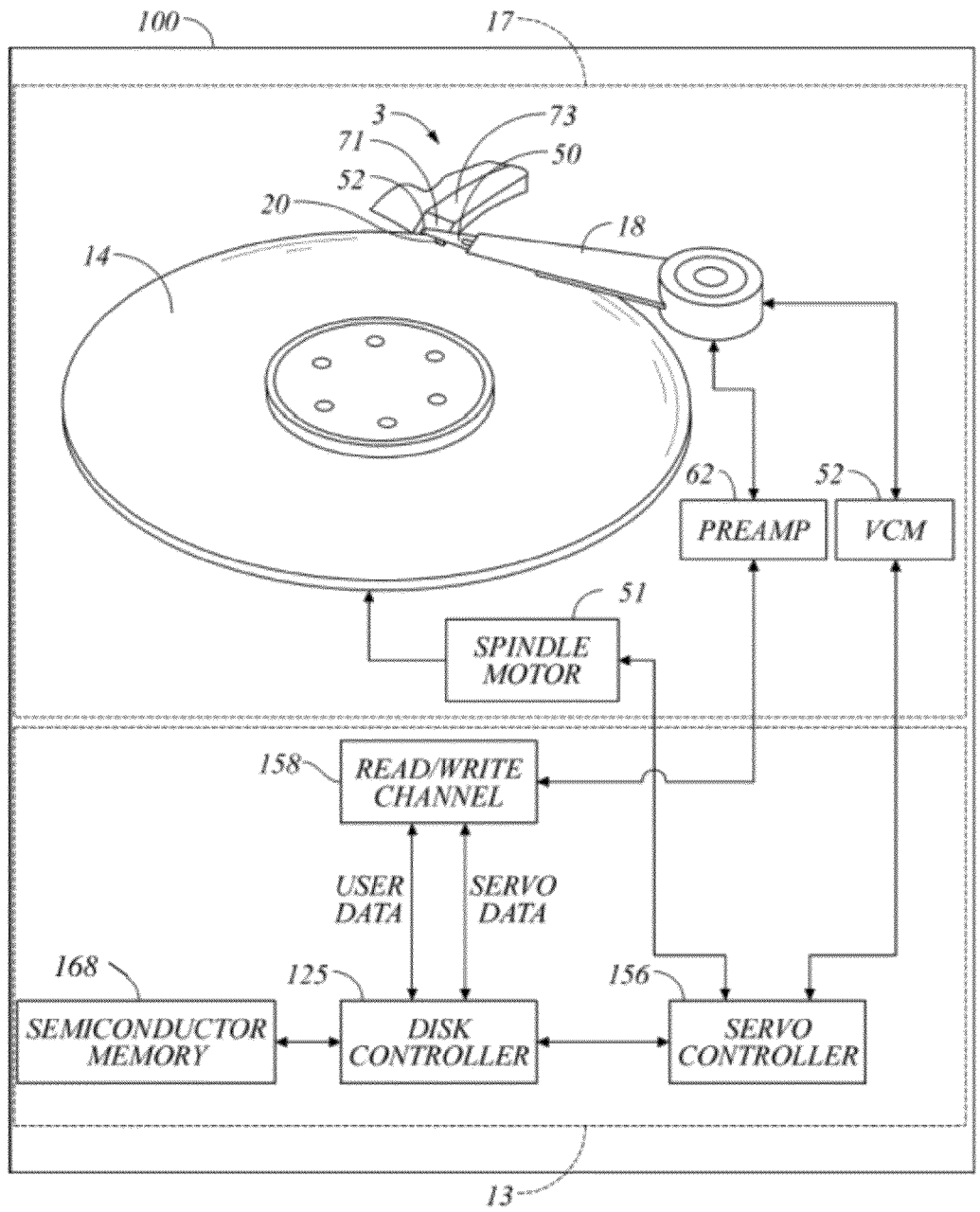
FIG. 6 is a block diagram illustrating a disk drive that utilizes a ramp position prior to servo-writing and performs self servo-writing, according to one embodiment of the invention.

Referring to FIG. 6, in an alternative embodiment, a disk drive 100 may perform a self servo-write without the assistance of system 2 or STW 10. For example, disk controller 125 may calculate a customized servo write stroke for HDA 17 between the ID of disk 14 and the position of the detected ramp 3. In some embodiments, the customized servo write stroke length may also comprise a margin relative to the ramp position. Further, based upon the calculated customized servo write stroke, disk controller 125 may further determine a new track spacing for the plurality of tracks to be servo-written to disk 14. Disk controller 125 may then command the writing of spiral servo sectors and/or product servo sectors to blank disk 14 to define the plurality of tracks based upon the new track spacing and customized servo write stroke, as previously discussed with reference to the separate STW 10 embodiment.

As particularly shown in FIG. 6, actuator arm 18 includes a head gimbal assembly (HGA) 50 to which head 20 is attached and a lift tab 52 that rides up upon an angled portion 71 of ramp 3. When the disk drive is powered down, lift tab 52 will ride up angled portion 71 and may then be loaded safely onto planar portion 73 of ramp 3 for storage.

The position of ramp 3 may be determined, as previously described, when a first integrator value of the head positioner current (e.g., current from VCM 52) exceeds a predetermined threshold indicating that lift tab 52 has come into contact with the angled portion 71 of ramp 3. It should be appreciated that this is only one example of a ramp configuration and that many other types of ramps may be utilized with the embodiments disclosed herein.

Figure 7:
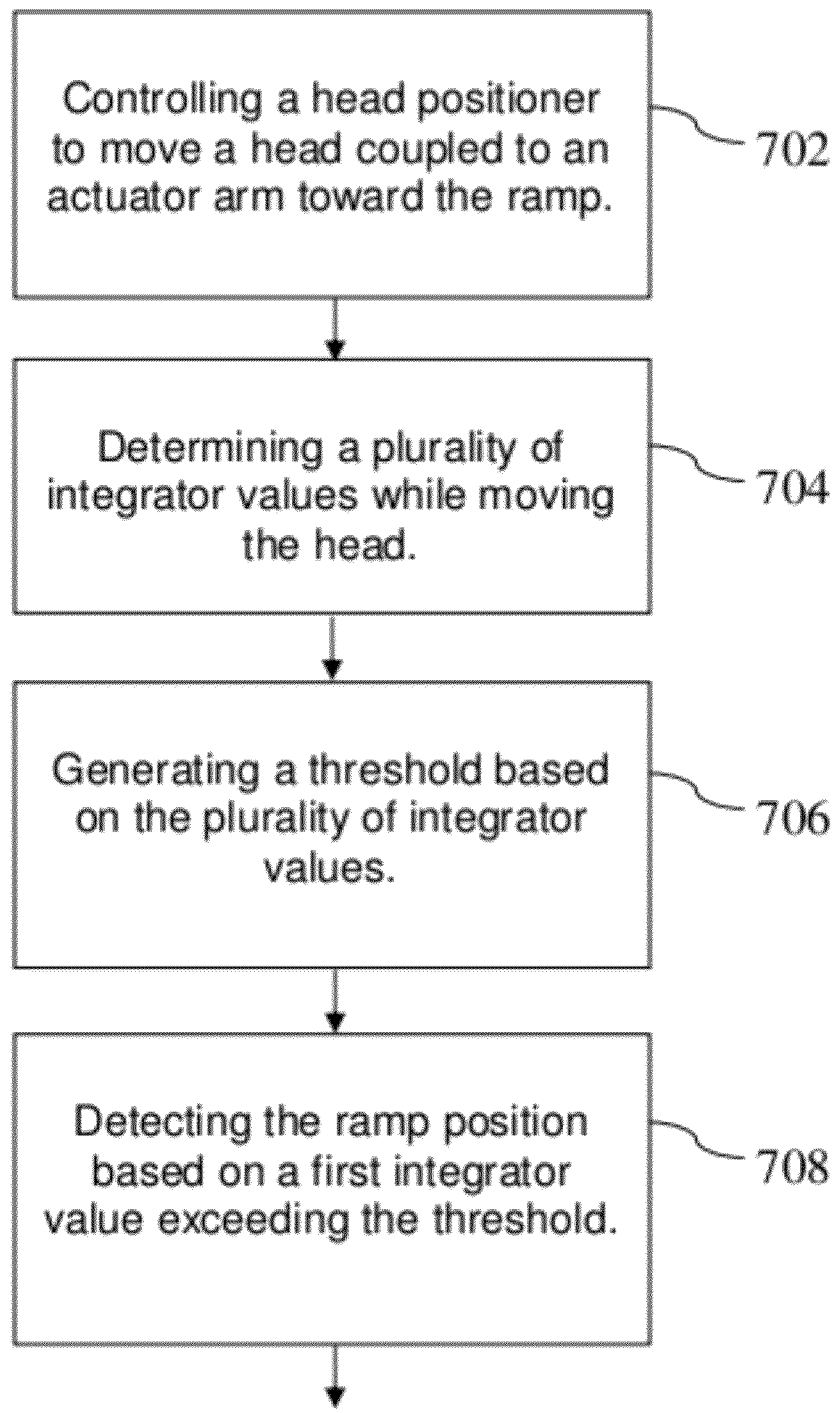
FIG. 7 illustrates a flow diagram illustrating a method for detecting a ramp position relative to a disk in a disk drive, according to one embodiment of the invention.

FIG. 7 illustrates a method for detecting a ramp position relative to a disk in a disk drive according to one embodiment of the invention. The method comprising: controlling a head positioner to move a head coupled to an actuator arm toward the ramp (block 702). Next, determining a plurality of integrator values while moving the head (block 704). At block 706, generating a threshold based on the plurality of integrator values. Lastly, detecting the ramp position based on at least a first integrator value exceeding the threshold (block 708).

Utilizing the previously-described techniques, greater track spacing between tracks may be provided on a disk resulting in reduced track squeeze and servo control errors both during testing and operation. Alternatively, utilizing these techniques, the disk space may be more effectively utilized to write more tracks to the disk.

The techniques previously described can be employed for disk drives with embedded servo systems. However, numerous alternatives for disk drives with similar or other media format characteristics can be employed by those skilled in the art to use the invention with equal advantage to implement these techniques. Further, although the embodiments have been described in the context of a disk drive with embedded servo sectors, the invention can be employed in many different types of disk drives having a head actuator that scans the media. For example, these techniques could be used with stamped media that includes servo information pre-written on the disk. The techniques disclosed herein could be used to detect the location of ramp 3 to avoid collisions with the ramp 3 at an undesirable velocity and/or to determine the maximum amount of available data tracks for the disk drive.

For the purposes of the present specification, it should be appreciated that the terms "processor", "microprocessor", and "controller", etc., refer to any machine or collection of logic that is capable of executing a sequence of instructions and shall be taken to include, but not be limited to, general purpose microprocessors, special purpose microprocessors, central processing units (CPUs), digital signal processors (DSPs), application specific integrated circuits (ASICs), multi-media controllers, signal processors and microcontrollers, etc.

The program or code segments may be stored in a processor readable medium or transmitted by a data signal embodied in a carrier wave, or a signal modulated by a carrier, over a transmission medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor circuitry to perform the operations described herein. The term "data" herein refers to any type of information that is encoded for machine-readable purposes. Therefore, it may include programs, code, data, files, etc.

What is claimed is:

1. A system for detecting a ramp position in a disk drive comprising:
   a disk;
   an actuator arm;
   a head coupled to the actuator arm for writing data to and reading data from the disk;
   a ramp;
   a head positioner coupled to the actuator arm to position the head relative to the disk; and
   a controller to:
      control the head positioner to move the head toward the ramp;
      determine a plurality of integrator values representative of a load current of the head positioner while moving the head across the disk, wherein at least a subset of the plurality of integrator values fit a mathematical function;
      generate a threshold based on the plurality of integrator values and the mathematical function, wherein the threshold indicates an increase in the load current of the head positioner; and
      determine the ramp position based on a first integrator value exceeding the threshold.

2. The system of claim 1, wherein the head positioner moves the head toward the ramp at a constant velocity.

3. The system of claim 1, wherein the integrator values generated by the controller comprise integrated position errors representing a head positioner load current.

4. The system of claim 3, wherein the head positioner load current increases in proportion to a frictional force of the ramp.

5. The system of claim 1, wherein generating the threshold based on the plurality of integrator values comprises performing a curve fit using a linear mathematical function.

6. The system of claim 1, wherein generating the threshold based on the plurality of integrator values comprises performing a curve fit using a second order mathematical function.

7. The system of claim 1, wherein the head positioner moves the head from an initial position on the disk toward the ramp position.

8. The system of claim 1, wherein the controller calculates a customized servo write stroke for the disk drive based on an initial position and the ramp position.

9. The system of claim 8, wherein the customized servo write stroke comprises a margin relative to the ramp position.

10. The system of claim 1, wherein determining the ramp position based on the first integrator value exceeding the threshold comprises evaluating the plurality of integrator values from an outer diameter towards an inner diameter.

11. The system of claim 10, wherein determining the ramp position based on the first integrator value exceeding the threshold comprises determining an intersection point between the first integrator value and the threshold.

12. The system of claim 1, wherein the head positioner comprises a micro-positioner.

13. The system of claim 1, wherein the head positioner comprises a push-pin.

14. The system of claim 1, wherein the head positioner comprises an interferometer and the head positioner detects an initial position before moving the head toward the ramp.

15. The system of claim 1, wherein the disk is a blank disk.

16. A method for detecting a ramp position relative to a disk in a disk drive comprising:
   controlling a head positioner to move a head coupled to an actuator arm toward the ramp;
   determining a plurality of integrator values representative of a load current of the head positioner while moving the head across the disk, wherein at least a subset of the plurality of integrator values fit a mathematical function;
   generating a threshold based on the plurality of integrator values and the mathematical function, wherein the threshold indicates an increase in the load current of the head positioner; and
   detecting the ramp position based on a first integrator value exceeding the threshold.

17. The method of claim 16, wherein the head positioner moves the head toward the ramp at a constant velocity.

18. The method of claim 16, wherein the integrator values are generated by a controller and comprise integrated position errors representing a head positioner load current.

19. The method of claim 18, wherein the head positioner load current increases in proportion to a frictional force of the ramp.

20. The method of claim 16, wherein generating the threshold based on the plurality of integrator values comprises performing a curve fit using a linear mathematical function.

21. The method of claim 16, wherein generating the threshold based on the plurality of integrator values comprises performing a curve fit using a second order mathematical function.

22. The method of claim 16, wherein the head positioner moves the head from an initial position on the disk toward the ramp position.

23. The method of claim 16, wherein the controller calculates a customized servo write stroke for the disk drive based on an initial position and the ramp position.

24. The method of claim 23, wherein the customized servo write stroke comprises a margin relative to the ramp position.

25. The method of claim 16, wherein determining the ramp position based on the first integrator value exceeding the threshold comprises evaluating the plurality of integrator values from an outer diameter towards an inner diameter.

26. The method of claim 25, wherein determining the ramp position based on the first integrator value exceeding the threshold comprises determining an intersection point between the first integrator value and the threshold.

27. The method of claim 16, wherein the head positioner comprises a micro-positioner.

28. The method of claim 16, wherein the head positioner comprises a push-pin.

29. The method of claim 16, wherein the head positioner comprises an interferometer and the head positioner detects an initial position before moving the head toward the ramp.

30. The method of claim 16, wherein the disk is a blank disk.

* * * * *